March 18, 1930.  L. D. SOUBIER  1,750,973
GLASS FEEDER
Original Filed Feb. 16, 1927
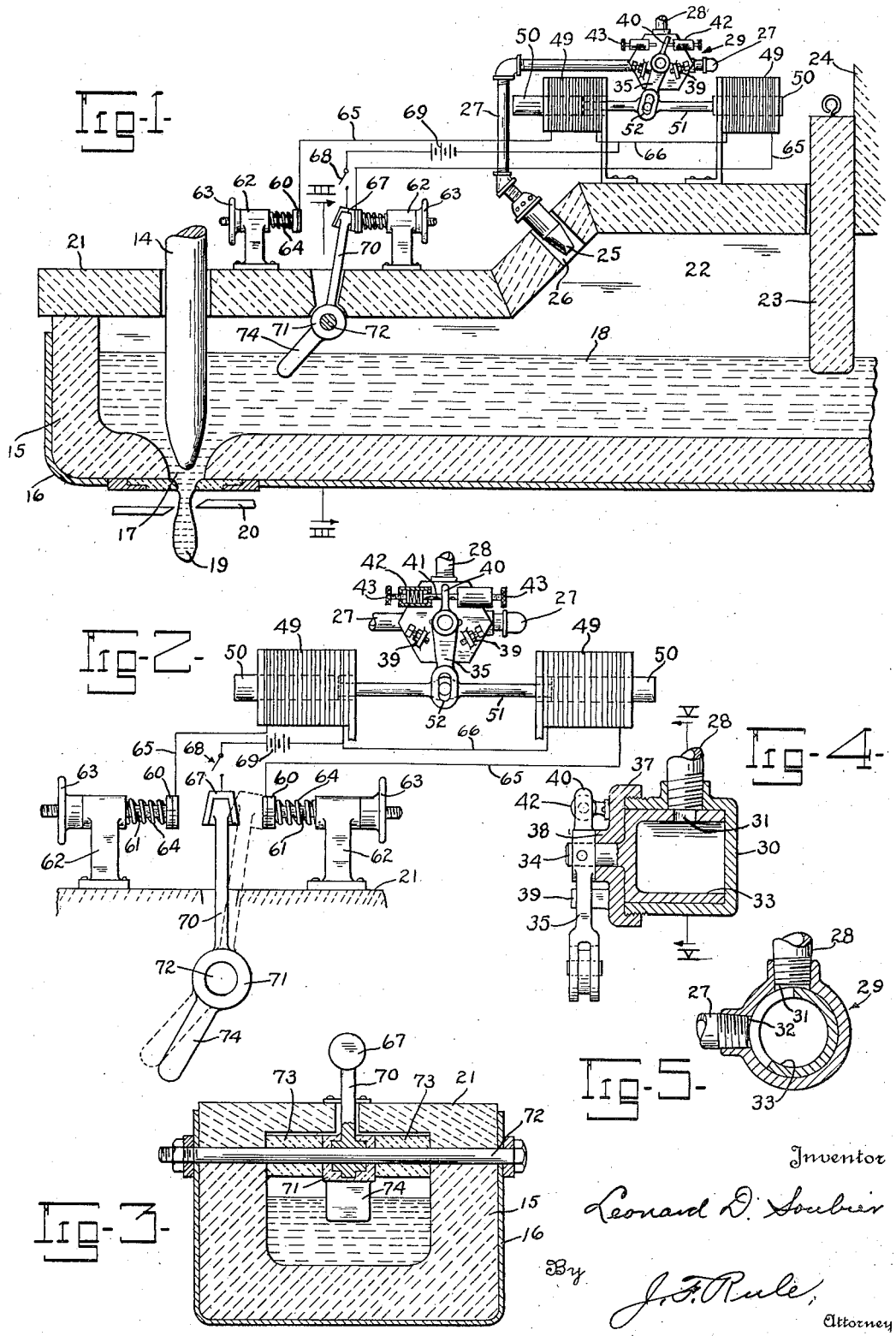
Inventor
Leonard D. Soubier
By J. F. Rule,
Attorney Patented Mar. 18, 1930

1,750,973

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASS FEEDER

Application filed February 16, 1927, Serial No. 168,725. Renewed September 13, 1929.

The present invention relates to improvements in glass feeders and particularly to means for maintaining uniform temperature conditions in the molten glass passing through the feeder.

Frequent temperature changes in molten glass are commonly met with in feeders from which charges are periodically transferred to forming molds. Such temperature changes cause the formation of charges of varying sizes and shapes, with the result that there is an appreciable lack of uniformity in the ware produced. This condition is particularly noticeable in feeders wherein charges are periodically suspended from the walls of a bottom outlet orifice and severed for delivery by gravity to the forming molds. Attempts have been made to maintain proper temperature conditions in the feeder by placing burners at proper locations. These burners, however, do not function to raise or lower the temperature in the boot in accordance with the particular condition of the molten glass therein. For example, if the glass entering the boot is too hot, these burners operate to further increase the temperature and proportionately increase the fluidity of the glass so that proper control of the suspension of uniform charges is extremely difficult, if not impossible.

An object of the present invention is to overcome the above objections by providing means operating automatically to vary the effectiveness of the burners as required by the particular temperature and condition of the molten glass.

Another object of the invention is to provide an automatic control for the fuel supply to the burners comprising means operated by changes in the viscosity and rate of movement of the molten glass in the feeder.

Other objects will be apparent hereinafter.

In the accompanying drawings:

Fig. 1 is a part sectional elevation showing the application of my invention to a gravity flow feeder, the illustration showing the manner in which the invention operates when the flowing glass becomes too hot.

Fig. 2 is a detail elevation showing the circuit closer inoperatively positioned in full lines and operatively positioned in dotted lines.

Fig. 3 is a transverse sectional view taken along the line III—III of Fig. 1.

Fig. 4 is a sectional view showing the connection between the fuel flow control valve and the operating means.

Fig. 5 is a sectional view taken on the line V—V of Fig. 4.

Broadly, the present invention contemplates automatic control of the temperature of a moving body of molten glass in a container such as a flow type feeder by providing an automatic valve to regulate the supply of fuel to heating devices with which the container or feeder is equipped as required by the particular condition of the glass. Actuation of the valve is directly controlled by viscosity and rate of movement of the molten glass, variations of the glass condition from a normal state causing operation of an electric circuit closer in an electric circuit including solenoids adapted to actuate the valve to increase or decrease the rate of fuel flow to the heating means.

Referring to the accompanying drawings, the feeder boot or forehearth 15 is supported in a casing 16 and is provided with a bottom outlet opening 17 through which molten glass issues from the body of glass 18 within the boot. The flow of glass is periodically retarded by a plunger 14, the issued glass being formed into charges 19 suspended from the walls of the outlet opening 17, such charges being severed at proper intervals by a cut-off 20. These charges are then delivered to suitable forming molds (not shown). A cover 21 is arranged over the boot 15 and at its inner end may be and preferably is stepped upwardly forming a combustion chamber 22 whose inner wall is formed by a vertically adjustable gate or cut-off valve 23, by means of which the inflow of molten glass from the furnace 24 is controlled. An injector or burner 25 projects into an opening 26 formed in the front wall of the combustion chamber 22 and is supplied with gas or other fuel through the pipe lines 27 and 28. An automatic fuel flow control valve 29 is interposed between the supply pipes 27 and 28 (Figs. 1 and 5).

The valve 29 comprises a housing 30 having an inlet 31 and an outlet 32 spaced from each other and directly connected to the fuel supply pipes 28 and 27, respectively. A rotatable valve body 33 is arranged within the housing 30, and carries a stem 34 to which is connected an operating lever 35 whose functions will be hereinafter apparent. A retaining cap 37 for the rotatable valve 33 is threaded upon the valve housing 30 (Fig. 6) and is formed with a short bearing 38 in which the valve stem 34 is journalled. The extent of movement of the valve operating lever 35 is limited by adjustable stops 39 carried by the retaining cap 37 (Fig. 2). An upwardly extending finger 40 is formed on the valve operating lever 35 and is engaged on opposite faces by inwardly projecting spring pressed plungers 41 of holding devices 42 which serve to yieldably hold the valve operating lever 35 at any predetermined normal operating position. Thus, it is seen that by adjusting the control screw of either of these devices 42, the normal operating position of the valve may be varied to suit conditions, and because of the differential pressure upon opposite sides of the finger 40 by the holding devices 42, when the lever 35 has been operated to move the valve away from its normal position, and then released, the lever and valve will automatically be returned to normal position.

Automatic operation of the valve is obtained by providing a pair of spaced solenoids 49 between which said valve is located, said solenoids including movable cores 50 interconnected by a connector 51. This connector 51 has a pin and slot connection 52 with the lower end of the valve operating lever 35 (Fig. 2). These solenoids are automatically brought into operation independently of each other by means of a circuit closer which is actuated by changes in the viscosity and rate of movement of the glass contained in the boot 15. This circuit closer includes a pair of contacts 60 carried on the adjacent inner ends of rods 61 mounted in brackets 62 and adjustable toward and from each other by hand wheels 63. Coil springs 64 are arranged between the contact heads 60 and the bracket 62, maintaining said heads in their innermost positions. Conductors 65 connect the contact heads 60 of the circuit closer with the outer ends of the solenoids 49. Conductors 66 interconnect the adjacent ends of the solenoids and a switch member 67 of the circuit closer, there being interposed between said member 67 and the solenoids, a switch 68 and a battery 69 or other source of current supply. The switch member or head 67 is fixed to the upper end of an arm 70, which arm carries a refractory sleeve 71 mounted on a transverse shaft 72, between spacing collars 73 also formed of suitable refractory material. Depending from the sleeve 71 is a paddle or finger 74 formed of refractory material, said finger being formed at an obtuse angle to the upstanding arm 70 of the switch member and adapted to project into the moving body of molten glass 18.

Operation of the apparatus may be stated as follows:

At the beginning of the feeder operation, the gas flow control valve 29 is set at an intermediate or central point (Fig. 5) and the switch 68 is opened so that movement of the depending finger 74 and closing of the circuit closer will not cause energization of either solenoid. After the molten glass has been flowing through the boot and proper temperature conditions of glass in the boot have been obtained, the hand wheels 63 of the circuit closer are adjusted to uniformly space the contact heads 60 from the switch member 67 a predetermined degree. The main switch 68 is then closed so that movement of the switch member 67 of the circuit closer into contact with either head 60 will close one circuit or the other and thereby energize one of the solenoids.

In the event the glass is running too hot and in a highly fluent state, the lower end of the finger 74 of the switch member is moved forwardly toward the nose of the boot and thereby causes engagement between the switch head 67 and the contact 60 to the right of said head (Fig. 1). Such closing of the circuit energizes the solenoid 49 at the right of the valve 29 (Fig. 1), with the result that the core 48 is moved to the position shown in Fig. 1 causing partial closing of the valve. Thus, the heat in the combustion chamber 22 is decreased so that the glass temperature drops somewhat, to bring about a return of the molten glass to a normal condition. This will permit the finger 74 to swing back sufficiently to open the switch and effect a return of the valve to normal position.

In the event the molten glass is running at a temperature below normal, the rate of movement will be lowered and the lower end of the finger 74 will move rearwardly away from the discharge orifice. Such movement of the finger 74 will cause engagement between the switch 67 and the contact head at the left of said head (Fig. 1) and consequent energization of the solenoid 49 at the left of the valve 29 (Fig. 1). This solenoid operates to open the fuel control valve 29 increasing the fuel supplied to the heating device, the time during which the valve remains open being determined by the position of the finger extending into the molten glass. It is obvious that so long as the glass continues to flow past the finger in a predetermined position, the circuit closer will remain active causing energization of one of the solenoids and consequent actuation of the fuel flow control valve.

Manifestly, certain minor changes may be resorted to within the spirit and scope of the appended claims.

What I claim is:

1. A glass feeder comprising in combination, a container for a moving body of molten glass, means for heating the glass, and mechanism responsive to variations in the viscosity of glass within the container and operated by the glass to control the effectiveness of the heating means.

2. A glass feeder comprising in combination, a container for a moving body of molten glass, heating devices extending into the container, a valve controlling flow of fuel to the heating devices, electrical mechanism for actuating the valve, and means actuated by the glass within the container in response to variations in the viscosity of glass to cause operation of said mechanism.

3. A glass feeder comprising in combination, a container for a moving body of molten glass, a heating device projecting into the container, an electrically operated valve controlling the fuel supply to said heating device, and means responsive to variations in the viscosity of glass within the container and operated by the glass to operate said valve and vary the effectiveness of the heating devices.

4. A glass feeder comprising in combination, a container for a moving body of molten glass, a burner projecting into said container, a valve controlling the flow of fuel to said burner, independent electrical devices arranged to actuate the valve to increase or decrease the flow of fuel therethrough, and a circuit closer actuated by the glass in response to variations in the glass viscosity to cause the operation of one of the electrical devices and thereby actuate the valve.

5. A glass feeder comprising a container for a moving body of molten glass, a burner projecting into said container, a valve regulating the supply of fuel to the burner, a pair of electrical devices operable independently of each other to actuate said valve, and means actuated by the glass in response to variations in the viscosity and rate of movement of the glass to operate one of said electrical devices.

6. A glass feeder comprising in combination, a container for a moving body of molten glass, a burner supplying heat to the glass, a valve regulating the supply of fuel to the burner, a pair of solenoids operable independently of each other to actuate said valve and increase or decrease the flow of fuel therethrough, a circuit closer operable to cause energization of either solenoid, and means contacting with the glass within the container and actuated by the glass in response to variations in the glass viscosity to control operation of the circuit closer.

7. A glass feeder comprising in combination, a container for a moving body of molten glass, a burner supplying heat to the glass, a valve regulating the supply of fuel to the burner, a pair of solenoids operable independently of each other to actuate said valve and increase or decrease the flow of fuel therethrough, a circuit closer operable to cause energization of either solenoid, and a finger carried by the circuit closer and projecting into the moving body of molten glass, said finger being movable by the molten glass in response to changes in the viscosity of the glass to actuate the circuit closer and thereby energize one of the solenoids.

8. A glass feeder comprising in combination, a container for a moving body of molten glass, a burner projecting into said container, a fuel flow control valve for said burner, a circuit closer including a pair of spaced contacts, an oscillatively mounted switch member between said contacts, a finger connected to said switch member and projecting into the moving body of molten glass, said finger being movable by the moving glass in response to changes in the viscosity of the glass to cause engagement between said switch member and one of the contacts, and a pair of electrical devices connected to the valve and in circuit with said circuit closer, said electrical devices being controlled by said circuit closer and operable independently of each other to operate the valve and vary the effectiveness of the burner.

9. A glass feeder comprising in combination, a container for a moving body of molten glass, heating means for said glass, and electrical devices controlling the effectiveness of the heating means and including a circuit closer having a portion projecting into the glass within the container and movable by the glass in response to variations in the viscosity of the glass to actuate said circuit closer.

10. A glass feeder comprising a container for a moving body of molten glass, means for heating the glass in the container, an electrically operated valve operative to vary the effectiveness of the heating means, and means operated upon by the glass within the container in response to variations in the glass viscosity to control the operation of the valve.

11. A glass feeder comprising a container for a moving body of molten glass, means for heating the glass in the container, an electrically operated valve operative to vary the effectiveness of the heating means, means partially located within the container and actuated by the glass in response to variations in the glass viscosity to control the opening or closing the valve beyond a normal operating point, and means for returning the valve to said normal operating point.

12. A glass feeder comprising in combination, a container for a moving body of molten glass, a burner for heating the glass in said container, a valve controlling the supply of fuel to the burner, a pair of independently operable solenoids adapted at times to open or close the valve beyond a normal operating station, automatic means for returning the valve to said normal station, and means operated upon by the glass within the container in response to variations in the glass viscosity to cause energization of one of said solenoids and consequent operation of the valve.

13. A glass feeder comprising in combination, a container for a moving body of molten glass, a burner projecting into said container, a valve controlling the supply of fuel to the burner, a pair of solenoids adapted at times to open or close the valve beyond a normal operating station, automatic means for returning the valve to said normal station, and a circuit closer arranged in a circuit with said solenoids and including a finger projecting into the body of molten glass, said finger being movable by the molten glass to positions depending on the viscosity of the molten glass to actuate the circuit closer.

14. A glass feeder comprising a container for a moving body of molten glass, a burner arranged to supply heat to the glass in said container, electrically operated means for controlling flow of fuel to the burner, and means operated upon by the glass within the container in response to changes in glass viscosity to control the operation of the fuel flow control means and thereby vary the effectiveness of the burner.

15. A glass feeder comprising a container for a moving body of molten glass, a burner projecting into said container, electrically operated means for controlling flow of fuel to the burner, means located partially within the container and actuated by the glass in the container in response to changes in glass viscosity to control the operation of the fuel flow control means and thereby vary the effectiveness of the burner, and means adjustable to permit operation of the fuel flow control means at predetermined degrees of glass viscosity.

16. A glass feeder comprising a container for a moving body of molten glass, a burner arranged to supply heat to the glass in said container, electrically operated means for controlling flow of fuel to the burner, means located partially within the container and actuated by the glass in response to changes in glass viscosity to operate the fuel flow control means to thereby vary the effectiveness of the burner, and means adjustable to permit operation of the fuel flow control means at predetermined degrees of glass viscosity, said last named means comprising a movable switch member having an operating finger projecting into the moving body of glass, and electrical contact heads adjustable toward and away from opposed faces of the switch member.

17. In combination, a container for molten glass having a bottom outlet near one end, means for applying heat to the glass, and means automatically controlling the effectiveness of the heating means and including a device moved by the glass within the container between the outlet opening and the heating means, to a position determined by the viscosity of the glass.

18. In combination, a container for molten glass having a bottom outlet near one end, means for applying heat to the glass, and means automatically controlling the effectiveness of the heating means and including a device operated by the glass within the container between the outlet opening and the heating means, said device projecting into the molten glass and actuated in response to changes in the glass viscosity.

19. In combination, a container for molten glass having a bottom outlet opening near one end, means for applying heat to the glass; and electrical means automatically controlling the effectiveness of the heating means, said electrical means including a circuit closer having an operating finger projecting into the molten glass at a point between the outlet opening and the heating means and actuated by the movement of the glass to positions determined by the glass viscosity.

Signed at Toledo, in the county of Lucas and State of Ohio, this 14th day of February, 1927.

LEONARD D. SOUBIER.